(12) United States Patent
Dai et al.

(10) Patent No.: US 12,141,943 B2
(45) Date of Patent: Nov. 12, 2024

(54) THREE-DIMENSIONAL POINT CLOUD UPSAMPLING METHOD, SYSTEM AND DEVICE, AND MEDIUM

(71) Applicant: SHANGHAI JIAO TONG UNIVERSITY, Shanghai (CN)

(72) Inventors: Wenrui Dai, Shanghai (CN); Yangmei Shen, Shanghai (CN); Chenglin Li, Shanghai (CN); Junni Zou, Shanghai (CN); Hongkai Xiong, Shanghai (CN)

(73) Assignee: SHANGHAI JIAO TONG UNIVERSITY, Shanghai (CN)

(*) Notice: Subject to any disclaimer, the term of this patent is extended or adjusted under 35 U.S.C. 154(b) by 0 days.

(21) Appl. No.: 18/424,889

(22) Filed: Jan. 29, 2024

(65) Prior Publication Data
US 2024/0202871 A1    Jun. 20, 2024

Related U.S. Application Data

(63) Continuation of application No. PCT/CN2022/113292, filed on Aug. 18, 2022.

(30) Foreign Application Priority Data

Aug. 26, 2021    (CN) .......................... 202110986829.3

(51) Int. Cl.
*G06T 3/4053* (2024.01)
*G06T 3/4046* (2024.01)
*G06T 7/10* (2017.01)

(52) U.S. Cl.
CPC .......... *G06T 3/4053* (2013.01); *G06T 3/4046* (2013.01); *G06T 7/10* (2017.01);
(Continued)

(58) Field of Classification Search
None
See application file for complete search history.

(56) References Cited

U.S. PATENT DOCUMENTS

| | | |
|---|---|---|
| 2018/0101932 A1 | 4/2018 | Kwon et al. |
| 2019/0004534 A1 | 1/2019 | Huang et al. |
| 2022/0012945 A1 | 1/2022 | Akhtar et al. |

FOREIGN PATENT DOCUMENTS

| | | | | |
|---|---|---|---|---|
| CN | 108319957 A | * | 7/2018 | ............. G06K 9/342 |
| CN | 110348299 A | * | 10/2019 | ......... G06K 9/00201 |

(Continued)

OTHER PUBLICATIONS

L. Pan, "ECG: Edge-aware Point Cloud Completion with Graph Convolution," in IEEE Robotics and Automation Letters, vol. 5, No. 3, pp. 4392-4398, Jul. 2020, doi: 10.1109/LRA.2020.2994483.*

(Continued)

*Primary Examiner* — Jiangeng Sun
(74) *Attorney, Agent, or Firm* — True Shepherd LLC; Andrew C. Cheng

(57) ABSTRACT

A three-dimensional point cloud upsampling method includes: dividing a three-dimensional point cloud into overlappable point cloud blocks which have a fixed number of points and are capable of covering all the points; extracting hierarchical features according to point coordinates in the point cloud blocks; achieving point set feature expansion of the extracted hierarchical features by using multi-scale heat kernel graph convolution; and reconstructing point coordinates in an upsampled three-dimensional point cloud from the expanded features. According to the present disclosure, detail information enhancement with different fine granularities can be performed on the three-dimensional point cloud which is sparse and nonuniformly distributed in the space, and at the same time, good stability is provided for overcoming potential noise disturbance and local deforma- (Continued)

tion. The method can promote the uniformity of spatial distribution of the upsampled dense point cloud, and ensure the accurate representation for a geometric structure of a target object.

7 Claims, 3 Drawing Sheets

(52) U.S. Cl.
CPC ........... *G06T 2207/10028* (2013.01); *G06T 2207/20016* (2013.01); *G06T 2207/20021* (2013.01)

(56) References Cited

FOREIGN PATENT DOCUMENTS

| CN | 111583263 | A | * | 8/2020 | ............... G06T 7/10 |
|---|---|---|---|---|---|
| CN | 111598998 | A | * | 8/2020 | ............. G06N 3/045 |
| CN | 111862289 | A |   | 10/2020 | |
| CN | 111882593 | A | * | 11/2020 | ........... G06K 9/6256 |
| CN | 112184556 | A | * | 1/2021 | ........... G06N 3/0454 |
| CN | 112257852 | A | * | 1/2021 | ........... G06N 3/0454 |
| CN | 112633350 | A | * | 4/2021 | ........... G06K 9/6256 |
| CN | 113674403 | A |   | 11/2021 | |

OTHER PUBLICATIONS

Cheng Li, Xiaoxiao Guo, Qiaozhu Mei, "DeepGraph: Graph Structure Predicts Network Growth", arXiv:1610.06251v1 [cs. SI] Oct. 20, 2016.*

Internation Search Report of PCT/CN2022/113292, Mailed Nov. 2, 2022.

* cited by examiner

THREE-DIMENSIONAL POINT CLOUD UPSAMPLING METHOD, SYSTEM AND DEVICE, AND MEDIUM

CROSS-REFERENCE TO RELATED APPLICATIONS

This application is a continuation of International Patent Application No. PCT/CN2022/113292 with a filing date of Aug. 18, 2022, designating the United States, now pending, and further claims priority to Chinese Patent Application No. 202110986829.3 with a filing date of Aug. 26, 2021. The content of the aforementioned applications, including any intervening amendments thereto, are incorporated herein by reference.

TECHNICAL FIELD

The present disclosure relates to the field of multimedia signal processing, specifically relates to a three-dimensional point cloud upsampling method, system and device, and a medium.

BACKGROUND ART

In recent years, deep neural network models have shown remarkable performances in classification and recognition of three-dimensional point clouds. Encouraged by this, researchers have begun to focus on solving the problem of point cloud upsampling by using deep learning methods. Yu et al. disclosed a point cloud upsampling network (PU-Net) in 2018 IEEE/CVF Conference on Computer Vision and Pattern Recognition, by which multi-scale point features are extracted by point sampling and neighborhood grouping, the features are concatenated, and point set expansion is performed by multi-branch double-layer point convolution, however, resolution loss is inevitably brought by downsampling. Subsequently, Yu et al. disclosed an edge-aware point set consolidation network (EC-Net) in European Conference on Computer Vision 2018, by which an edge fine structure of a point cloud is sharpened by minimizing a loss function of a distance from a point to an edge, and the training process relies on manual edge labeling which consumes time and labor. Wang et al. disclosed a multi-stage point cloud upsampling method (MPU) in 2019 IEEE/CVF Conference on Computer Vision and Pattern Recognition, by which an input point cloud is upsampled progressively with different fine granularities with reference to a multi-stage network training mechanism for image super-resolution, and its staged module training requires high calculation complexity. Li et al. disclosed a generative adversarial network (PU-GAN) for point cloud upsampling in 2019 IEEE/CVF International Conference on Computer Vision and Wu et al. disclosed an adversarial residual graph convolutional network (AR-GCN) in British Machine Vision Conference 2020, by which a generative adversarial mechanism is introduced to generate dense point clouds, and the distribution of expected points in a hidden space is constrained by using a discriminator, however, due to the structural complexity, the network is not easy to converge. Qian et al. disclosed a geometry-based point cloud upsampling method (PU-Geo) in European Conference on Computer Vision 2020, by which basic geometric features of a point neighborhood are learned according to a local parameterization form of discrete differential geometry, coordinates and normal vectors of a point cloud are jointly upsampled from a plane parameter space, sampled points are lifted to a curved space by using the learned geometric transformation, and the training process requires the normal vectors as additional supervision data, but a lot of original data such as LiDAR point clouds do not contain normal direction information. Qian et al. disclosed a point cloud upsampling network based on a graph convolutional network (PU-GCN) in 2021 IEEE/CVF Conference on Computer Vision and Pattern Recognition, by which multi-scale neighborhood features are extracted in combination with an Inception network structure and densely-connected dilated graph convolution, a perception field is expanded on the premise of keeping convolution kernel parameter quantity unchanged, and high-dimensional features are extracted by using single graph convolution layer to achieve point set expansion, but the dilated convolution requires tedious manual parameter adjustment, which easily results in local information loss to cause a checkerboard effect, and the direct expansion in a feature space cannot utilize geometric shape information of a potential curved surface.

SUMMARY OF THE INVENTION

For overcoming defects in the prior art, the present disclosure provides a three-dimensional point cloud upsampling method, system and device, and a medium, by which detail information enhancement with different fine granularities can be performed on a three-dimensional point cloud which is sparse and nonuniformly distributed in the space, and at the same time, good stability is provided for overcoming potential noise disturbance and local deformation.

According to a first aspect of the present disclosure, provided is a three-dimensional point cloud upsampling method, including:
  dividing a three-dimensional point cloud into overlappable point cloud blocks which have a fixed number of points and are capable of covering all the points;
  extracting hierarchical features according to point coordinates in the point cloud blocks;
  achieving point set feature expansion of the extracted hierarchical features by using multi-scale heat kernel graph convolution; and
  reconstructing point coordinates in an upsampled three-dimensional point cloud from the expanded features.

Optionally, said extracting hierarchical features according to point coordinates in the point cloud blocks is achieved by a deeply and densely connected dynamic graph convolutional network composed of a plurality of dynamic graph convolutional units, inputs of the network are three-dimensional coordinates $X \in \mathbb{R}^{N \times 3}$ of N points in the point cloud blocks, and outputs of the network are the hierarchical features $H \in \mathbb{R}^{N \times n_H}$, wherein an input feature of a first dynamic graph convolutional unit is expressed as $\hat{H}^0 = X$, an output feature $\hat{H}^{k-1}$ of a $(k-1)^{th}$ dynamic graph convolutional unit is used as an input feature of a $k^{th}$ dynamic graph convolutional unit, updating is performed to obtain an output feature $\hat{H}^k$ of the $k^{th}$ dynamic graph convolutional unit, and an output feature $\hat{H}^{l_1}$ of the final $l_{1_{th}}$ dynamic graph convolutional unit is used as the output hierarchical features $H \in \mathbb{R}^{N \times n_H}$.

The dynamic graph convolutional units perform the following operations:
  constructing $K_1$-nearest neighbor graph $G_1^k$ according to the similarity among input features $\hat{H}^{k-1} \in \mathbb{R}^{N \times n_h^{k-1}}$ to generate an adjacency matrix $A_1^k$;
  for an $n_h^{k-1}$-dimensional input feature $\hat{h}_i^k \in \mathbb{R}^{n_h^{k-1}}$ of any point i, calculating an $n_h^{k-1}$-dimensional feature translation vector $\hat{h}_i^k - \hat{h}_j^k$ relative to all adjacent points j, concatenating with an input feature $\hat{h}_i^k$ to generate a $2n_h^{k-1}$-dimensional vector ConcatV($\hat{h}_i^k, \hat{h}_j^k - \hat{h}_i^k$) and extracting a local neighborhood feature $\tilde{h}_{ij}^k \in R^{n_h^k}$ of the point by graph convolution:

$$\tilde{h}_{ij}^k = GConvok_{\Theta_k}(ConcatV(\hat{h}_i^k, \hat{h}_j^k - \hat{h}_i^k))$$

wherein ConcatV is a concatenation operation for the vectors, and $\Theta^k \in R^{2n_h^{k-1} \times n_h^k}$ is a learnable parameter of graph convolution $GConvok_{\Theta_k}$;

for a neighbourhood $N^k(i)$ of the point i, aggregating local neighbourhood features $\tilde{h}_{ij}^k$, $j \in N^k(i)$ as an output feature $$h_i^k \in R^{n_h^k}: h_i^k = \max_{j \in N^k(i)} \tilde{h}_{ij}^k$$

of the point by rank-invariant maximum pooling layers; and merging output features $h_i^k$ of all the points to obtain an output feature matrix $\hat{H}^k \in R^{N \times n_h^k}$ of a point cloud block with N points.

Optionally, the multi-scale heat kernel graph convolution is achieved by a multi-scale heat kernel graph filter bank in cross-layer connection, and responses of the multi-scale heat kernel graph filter bank are achieved by any one of the following ways:

an aggregation way in which the parameter complexity is high and the number of scales is variable:

enabling the input hierarchical features $H \in R^{N \times n_H}$ to respectively pass through S heat kernel graph filters with different heat diffusion scales $t_1, \ldots, t_S$, and obtaining S corresponding filtering responses $H_1, \ldots, H_S$ according to a nonlinear activation function $\sigma(\cdot)$, wherein a filtering response $H_s \in R^{N \times Rn_H}$ to a scale s is expressed as:

$$H_s = \sigma(\exp(-t_s L) H W_s)$$

wherein $\exp(-t_s L) \in R^{N \times N}$ is a heat kernel function of a heat diffusion scale $t_s$, L is a Laplacian matrix of $K_2$-nearest neighbor graph constructed according to the similarity among point coordinates in an input point cloud block, $W_s \in R^{n_H \times Rn_H}$ is a learnable parameter matrix of the $s^{th}$ scale and is used for feature transformation and adaptive aggregation of the scale s, the number of rows is an input feature dimension $n_H$, and the number of columns is a product of the input feature dimension and an upsampling rate $Rn_H$;

summing S filtering responses with different heat diffusion scales to obtain an aggregated feature matrix, rearranging the aggregated feature matrix, keeping the number of matrix elements constant, enabling the number of the rows of the matrix to be equal to the number RN of upsampled target points, and enabling the number of the columns to be a dimension $n_H$ of the input feature:

$$H'_A = \text{Reshape}\left(\sum_{s=1}^{S} H_s\right)$$

wherein Reshape $(\cdot): R^{N \times Rn_H} \to R^{RN \times n_H}$ is a rearranging operation for obtaining a rearranged feature matrix $H'_A \in R^{RN \times n_H}$; and duplicating and expanding the input hierarchical features $H \in R^{N \times n_H}$ at the upsampling rate R by cross-layer connection, copying each row of the matrix for R rows to obtain an expanded input feature $H'_T \in R^{RN \times n_H}$, and adding the expanded input feature with the aggregated feature matrix HA to obtain an expanded feature matrix $\hat{H}_A \in R^{RN \times n_H}$; and a concatenation way in which the parameter complexity is low and the number of scales is fixed as an upsampling rate R:

enabling the input hierarchical features $H \in R^{N \times n_H}$ to respectively pass through R heat kernel graph filters with different heat diffusion scales $t_1, \ldots, t_R$, and obtaining R corresponding filtering responses $H_1, \ldots, H_R$ according to a nonlinear activation function $\sigma(\cdot)$, wherein a filtering response $H_s \in R^{N \times n_H}$ to a scale s is expressed as:

$$H_s = \sigma(\exp(-t_s L) H W_s)$$

wherein $\exp(-t_s L) \in R^{N \times N}$ is a heat kernel function of a heat diffusion scale $t_s$, L is a Laplacian matrix of $K_2$-nearest neighbor graph constructed according to the similarity among point coordinates in an input point cloud block, $W_s \in R^{n_H \times n_H}$ is a learnable parameter matrix of the $s^{th}$ scale and is used for feature transformation and adaptive aggregation of the scale s, and both of the number of rows and the number of columns are input feature dimensions $n_H$;

aligning R filtering responses with different heat diffusion scales in rows to perform concatenation to obtain a concatenated feature matrix $H'_C \in \mathbb{R}^{RN \times n_H}$:

$$H'_C = ConcatM(H_1, H_2, \ldots, H_R)$$

wherein ConcatM is a concatenation operation based on alignment in rows; and duplicating and expanding the input hierarchical features $H \in \mathbb{R}^{N \times n_H}$ at the upsampling rate R by cross-layer connection, copying each row of the matrix for R rows to obtain an expanded input feature $H'_T \in R^{RN \times n_H}$, and adding the expanded input feature with the concatenated feature matrix $H'_C$ to obtain an expanded feature matrix $\hat{H}_C \in R^{RN \times n_H}$.

Optionally, said reconstructing point coordinates in an upsampled three-dimensional point cloud from the expanded features includes:

enabling an expanded feature matrix $\hat{H}$ to pass through a fully-connected network, wherein when the aggregation mode is adopted, $\hat{H} = \hat{H}_A$, when the concatenation mode is adopted, $\hat{H} = \hat{H}_C$, and the fully-connected network is composed of a plurality of fully-connected layers which are nonlinearly activated:

$$Y' = \sigma'\left(FC_{\theta_{l_2}}\left(\ldots \sigma'\left(FC_{\theta_2}\left(\sigma'\left(FC_{\theta_1}(\hat{H})\right)\right)\right)\right)\right)$$

wherein $\sigma'$ is a nonlinear activation function, $l_2$ is the number of fully-connected network layers, and $FC_{\theta_i}$ is the $i^{th}$ fully-connected layer with a learnable parameter $\theta_i$;

duplicating and expanding point coordinates $X \in \mathbb{R}^{N \times 3}$ in a point cloud block at the upsampling rate R by cross-layer connection, copying each row of the matrix for R rows to obtain expanded point cloud block coordinates $X'_T \in \mathbb{R}^{RN \times 3}$, and adding the expanded point cloud block coordinates with an output Y' of the fully-connected network to obtain point coordinates $Y \in R^{RN \times 3}$ of the point cloud block with the upsampling rate R; and aggregating point coordinates in all upsampled point cloud blocks, and performing farthest point resampling to obtain the upsampled three-dimensional point cloud.

Optionally, the learnable parameter in the three-dimensional point cloud upsampling method is obtained based on end-to-end training for the point cloud blocks, which includes:

collecting three-dimensional point cloud data and upsampled reference point cloud data from a three-dimensional shape in a polygonal grid form by Poisson disk sampling, normalizing all collected spatial coordinates of the point cloud to a unit sphere of which the central point is on an origin location and the radius is 1, randomly selecting a query point as the center from the three-dimensional point cloud, selecting a point closest to the center in spatial distance to form an input point cloud block, and normalizing all extracted $K_3$-nearest neighboring blocks to the unit sphere to serve as a training data set;

obtaining an upsampled three-dimensional point cloud $\hat{Q}$ from the three-dimensional point cloud by using the three-dimensional point cloud upsampling method;

calculating a Chamfer distance between the upsampled three-dimensional point cloud $\hat{Q}$ and a reference point cloud Q:

$$\mathcal{L}_{CD}(Q, \hat{Q}) = \frac{1}{|Q|}\sum_{q \in Q}\min_{\hat{q} \in \hat{Q}}\|y_q - y_{\hat{q}}\|_2^2 + \frac{1}{|\hat{Q}|}\sum_{\hat{q} \in \hat{Q}}\min_{q \in Q}\|y_q - y_{\hat{q}}\|_2^2$$

wherein $|Q|$ and $|\hat{Q}|$ are respectively the numbers of points in Q and $\hat{Q}$, and $y_q$ and $y_{\hat{q}}$ are respectively three-dimensional coordinates of point q in Q and point q in Q;

calculating repulsion loss of spatial distribution of points in the upsampled three-dimensional point cloud Q:

$$\mathcal{L}_{Rep}(\hat{Q}) = \frac{1}{K_4|Q|}\sum_{\hat{q} \in \hat{Q}}\sum_{\hat{q}_k \in \bar{N}(\hat{q})}\max(\eta - \|\hat{q} - \hat{q}_k\|_2^2, 0)$$

wherein $\bar{N}(\hat{q})$ is a $K_4$-nearest neighboring point set of point $\hat{q}$, and n is an empirical constant;

calculating a loss function $\mathcal{L} = \mathcal{L}_{CD}(Q, \hat{Q}) + \alpha\mathcal{L}_{Rep}(\hat{Q}) + \beta\|\Theta\|^2$, wherein $\|\Theta\|^2$ is a two-norm regularization loss item of a learnable parameter $\Theta$ in the three-dimensional point cloud upsampling method;

calculating a gradient of the learnable parameter $\Theta$ according to the loss function, and performing back propagation to update the learnable parameter $\Theta$ in the three-dimensional point cloud upsampling method; and repeating the steps of three-dimensional point cloud upsampling, loss function calculation and back propagation until convergence, and updating the obtained learnable parameter $\Theta$ for upsampling the three-dimensional point cloud.

According to a second aspect of the present disclosure, provided is a three-dimensional point cloud upsampling system, including:

a data acquisition module configured to acquire three-dimensional point cloud data;

a feature extraction module configured to divide the three-dimensional point cloud data into point cloud blocks having a fixed number of points and extract hierarchical features according to point coordinates in the point cloud blocks; a point set acquisition module configured to achieve different-scale point set feature expansion of the extracted hierarchical features by using multi-scale heat kernel graph convolution; and a coordinate reconstruction module configured to reconstruct upsampled three-dimensional point cloud coordinates from the expanded features.

According to a third aspect of the present disclosure, provided is a three-dimensional point cloud upsampling device, including a memory, a processor and a computer program stored on the memory and capable of running on the processor; wherein the processor, when executing the computer program, is useful for performing the above-mentioned three-dimensional point cloud upsampling method. Compared with the prior art, embodiments of the present disclosure have at least one of the following beneficial effects:

in the above-mentioned three-dimensional point cloud upsampling method and system provided by the present disclosure, the multi-scale heat kernel graph convolution is adopted, so that local geometric features and a global topological structure of the point cloud can be effectively represented, detail information enhancement with different fine granularities can be performed on an initially-input point cloud, and at the same time, good stability is provided for overcoming potential noise disturbance and local deformation.

In the above-mentioned three-dimensional point cloud upsampling method and system provided by the present disclosure, the multi-scale heat kernel graph filters in cross-layer connection are adopted, so that the generation quality of the point cloud can be enhanced, the uniformity of spatial distribution of the upsampled dense point cloud can be promoted, the accurate representation for a geometric structure of a target object is ensured, and at the same time, the convergence rate of network parameter training is increased.

Compared with an existing method (with reference to embodiments), the above-mentioned three-dimensional point cloud upsampling method and system provided by the present disclosure achieve consistent performance improvement.

BRIEF DESCRIPTION OF THE DRAWINGS

By reading detailed description for nonrestrictive embodiments with reference to the following accompanying drawings, other features, objectives and advantages of the present disclosure will become more apparent.

DETAILED DESCRIPTION OF THE INVENTION

The present disclosure will be described in detail below in conjunction with specific embodiments. The following embodiments will be beneficial for the skilled in the art to further understand the present disclosure, but do not limit the present disclosure in any form. It should be noted that those of ordinary skill in the art may further make various deformations and variations without departing from the concept of the present disclosure. All of these deformations and variations fall within the protection scope of the present disclosure.

Figure 1:
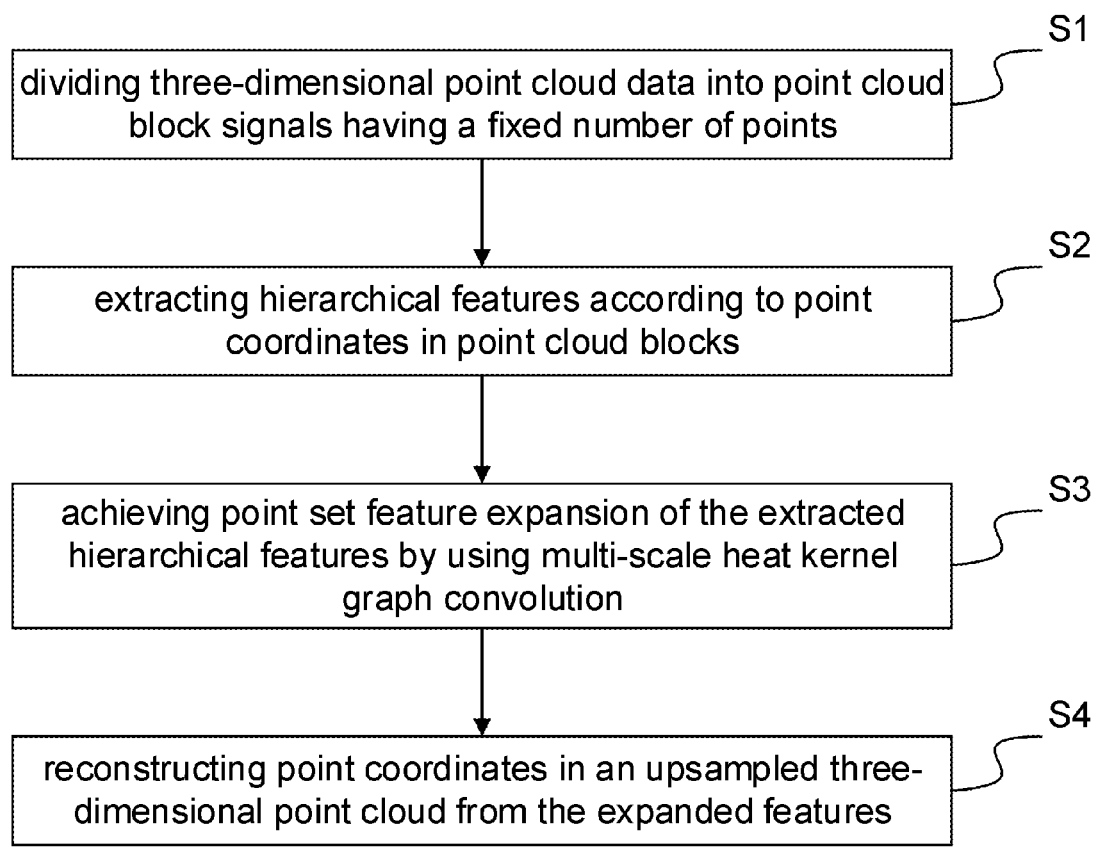
FIG. 1 is a schematic diagram of a three-dimensional point cloud upsampling method in an embodiment of the present disclosure.

FIG. 1 is a flow diagram of a three-dimensional point cloud upsampling method based on a graph convolutional network provided in a preferred embodiment of the present disclosure.

As shown in FIG. 1, the three-dimensional point cloud upsampling method provided in the preferred embodiment may include the following steps:

S1, a three-dimensional point cloud is divided into overlappable point cloud blocks which have a fixed number of points and are capable of covering all the points.

A three-dimensional point cloud $\mathcal{P} = \{p_i, i=1, \ldots, P\}$ having P points is divided into M point cloud blocks, wherein each point cloud block includes N points, and any one point $p_i$ in P is included in one or more of the point cloud blocks.

S2, hierarchical features are extracted according to point coordinates in the point cloud blocks, which is achieved by a deeply and densely connected dynamic graph convolutional network composed of a plurality of dynamic graph convolutional units, inputs of the network are three-dimensional coordinates $X \in R^{N \times 3}$ of N points in the point cloud blocks, and outputs of the network are the hierarchical features $H \in R^{N \times n_H}$, wherein an input feature of a first dynamic graph convolutional unit is expressed as $\hat{H}^0 = X$, an output feature $\hat{H}^{k-1}$ of a $(k-1)^{th}$ dynamic graph convolutional unit is used as an input feature of a $k^{th}$ dynamic graph convolutional unit, updating is performed to obtain an output feature $\hat{H}^k$ of the $k^{th}$ dynamic graph convolutional unit, and an output feature $\hat{H}^{l_1}$ of the final $l_1^{th}$ dynamic graph convolutional unit is used as the output hierarchical features $H \in R^{N \times n_H}$; the dynamic graph convolutional units include the following steps:

S21, $K_1$-nearest neighbor graph $\mathcal{G}_1^k$ are constructed according to the similarity among input features $\hat{H}^{k-1} \in R^{N \times n_h^{k-1}}$ to generate an adjacency matrix $A_1^k$;

S22, for an $n_h^{k-1}$-dimensional input feature $\hat{h}_i^k \in R^{n_h^{k-1}}$, which is a vector in the $i^{th}$ row of $\hat{H}^{k-1}$, of any point i, an $n_h^{k-1}$-dimensional feature translation vector $\hat{h}_i^k - \hat{h}_j^k$ relative to all adjacent points j is calculated, concatenation with an input feature $\hat{h}_i^k$ is performed to generate a $2n_h^{k-1}$-dimensional vector ConcatV $(\hat{h}_i^k, \hat{h}_j^k - \hat{h}_i^k)$ and a local neighborhood feature $\tilde{h}_{ij}^k \in R^{n_h^k}$ of the point is extracted by graph convolution:

$$\tilde{h}_{ij}^k = GConvok_{\Theta_k}(ConcatV(\hat{h}_i^k, \hat{h}_j^k - \hat{h}_i^k))$$

wherein ConcatV is a concatenation operation for the vectors, and $\Theta k \in R^{2n_h^{k-1} \times n_h^k}$ is a learnable parameter of graph convolution $GConvek_{\Theta_k}$;

S23, for a neighbourhood $N^k(i)$ of the point i, local neighbourhood features $\tilde{h}_{ij}^k$, $j \in N^k(i)$ are aggregated as an output feature $$h_i^k \in R^{n_h^k}: h_i^k = \max_{j \in N^k(i)} \tilde{h}_{ij}^k$$

of the point by rank-invariant maximum pooling layers; and output features $h_i^k$ of all the points are merged to obtain an output feature matrix $\hat{H}^K \in R^{N \times n_h^k}$ of a point cloud block with N points.

S3, point set feature expansion of the extracted hierarchical features is achieved by using multi-scale heat kernel graph convolution.

In the present embodiment, the multi-scale heat kernel graph convolution is adopted, so that local geometric features and a global topological structure of the point cloud can be effectively represented, detail information enhancement with different fine granularities can be performed on an initially-input point cloud, and at the same time, good stability is provided for overcoming potential noise disturbance and local deformation.

Figure 2:
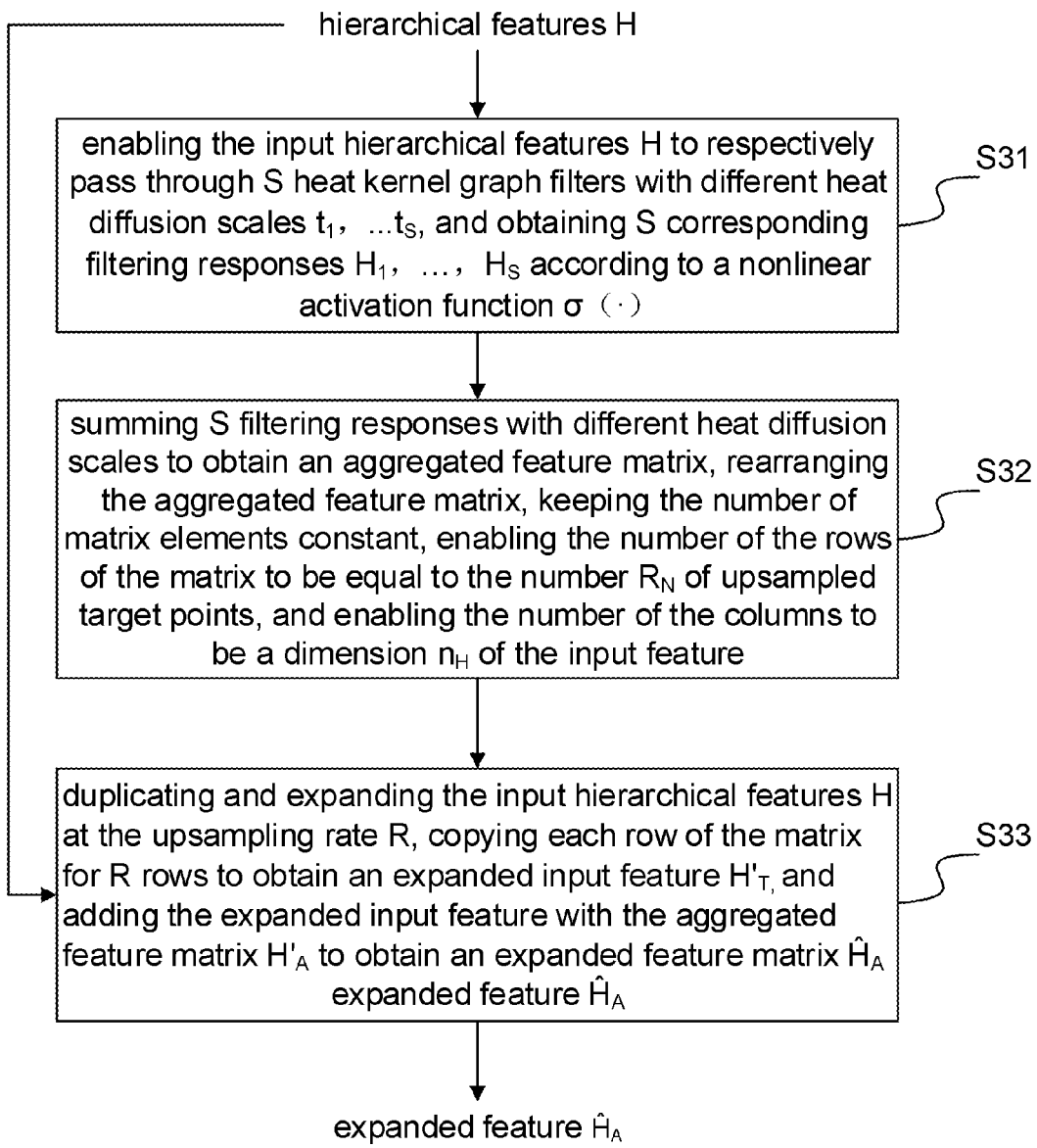
FIG. 2 is a schematic diagram of multi-scale heat kernel graph convolution in an aggregation mode in an embodiment of the present disclosure.

As shown in FIG. 2, as one preferred embodiment, S3 may be achieved in an aggregation way in which the parameter complexity is high and the number of scales is variable, and which includes the following steps:

S31, the input hierarchical features $H \in R^{N \times n_H}$ are enabled to respectively pass through S heat kernel graph filters with different heat diffusion scales $t_1, \ldots, t_S$, and S corresponding filtering responses $H_1, \ldots, H_S$ are obtained according to a nonlinear activation function $\sigma(\cdot)$, wherein a filtering response $H_s \in R^{N \times Rn_H}$ to a scale s is expressed as:

$$H_s = \sigma(\exp(-t_s L)HW_s)$$

wherein $\exp(-t_s L) \in R^{N \times N}$ is a heat kernel function of a heat diffusion scale $t_s$, L is a Laplacian matrix of $K_2$-nearest neighbor graph constructed according to the similarity among point coordinates in an input point cloud block, $W_s \in R^{n_H \times Rn_H}$ is a learnable parameter matrix of the $s^{th}$ scale and is used for feature transformation and adaptive aggregation of the scale s, the number of rows is an input feature dimension $n_H$, and the number of columns is a product of the input feature dimension and an upsampling rate $Rn_H$;

S32, S filtering responses with different heat diffusion scales are summed to obtain an aggregated feature matrix, the aggregated feature matrix is rearranged, the number of matrix elements is kept constant, the number of the rows of the matrix is enabled to be equal to the number RN of upsampled target points, and the number of the columns is enabled to be a dimension $n_H$ of the input feature:

$$H'_A = \text{Reshape}\left(\sum_{s=1}^{S} H_s\right)$$

wherein Reshape $(\cdot): R^{N \times Rn_H} \to R^{RN \times n_H}$ is a rearranging operation for obtaining a rearranged feature matrix $H'_A \in R^{RN \times n_H}$; and S33, the input hierarchical features $H \in R^{N \times n_H}$ are duplicated and expanded at the upsampling rate R by cross-layer connection, each row of the matrix is copied for R rows to obtain an expanded input feature $H'_T \in R^{RN \times n_H}$, and the expanded input feature is added with the aggregated feature matrix HA to obtain an expanded feature matrix $\hat{H}_A \in \mathbb{R}^{RN \times n_H}$.

Figure 3:
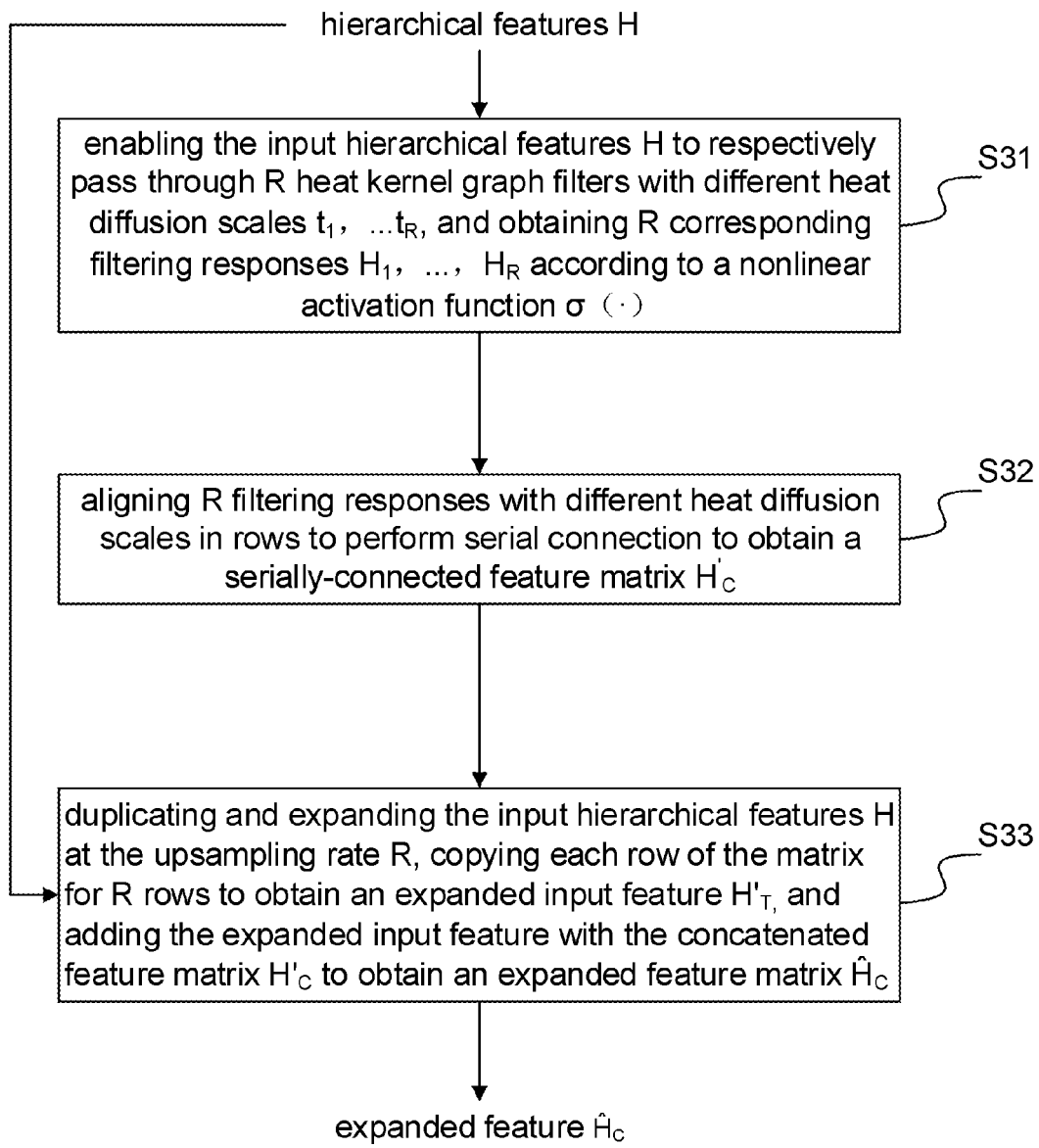
FIG. 3 is a schematic diagram of multi-scale heat kernel graph convolution in a concatenation mode in an embodiment of the present disclosure.

As shown in FIG. 3, as another preferred embodiment, S3 may be achieved in a concatenation way in which the parameter complexity is low and the number of scales is fixed as an upsampling rate R, and which includes the following steps:

S31, the input hierarchical features $H \in \mathbb{R}^{N \times n_H}$ are enabled to respectively pass through R heat kernel graph filters with different heat diffusion scales $t_1, \ldots, t_R$, and R corresponding filtering responses $H_1, \ldots, H_R$ are obtained according to a nonlinear activation function $\sigma(\cdot)$, wherein a filtering response $H_s \in R^{N \times n_H}$ to a scale s is expressed as:

$$H_s = \sigma(\exp(-t_s L)HW_s)$$

wherein $\exp(-t_s L) \in R^{N \times N}$ is a heat kernel function of a heat diffusion scale $t_s$, L is a Laplacian matrix of $K_2$-nearest neighbor graph constructed according to the similarity among point coordinates in an input point cloud block, $W_s \in \mathbb{R}^{n_H \times n_H}$ is a learnable parameter matrix of the $s^{th}$ scale and is used for feature transformation and adaptive aggregation of the scale s, and both of the number of rows and the number of columns are input feature dimensions $n_H$;

S32, R filtering responses are aligned with different heat diffusion scales in rows to perform concatenation to obtain a concatenated feature matrix $H'_C \in \mathbb{R}^{RN \times n_H}$:

$$H'_C = \text{ConcatM}(H_1, H_2, \ldots, H_R)$$

wherein ConcatM is a concatenation operation based on alignment in rows; and

S33, the input hierarchical features $H \in \mathbb{R}^{N \times n_H}$ are duplicated and expanded at the upsampling rate R by cross-layer connection, each row of the matrix is copied for R rows to obtain an expanded input feature $H'_T \in \mathbb{R}^{RN \times n_H}$, and the expanded input feature is added with the concatenated feature matrix $H'_C$ to obtain an expanded feature matrix $\hat{H}_C \in \mathbb{R}^{RN \times n_H}$ S4, point coordinates in an upsampled three-dimensional point cloud are reconstructed from the expanded features, which may include the following steps:

S41, an expanded feature matrix $\hat{H}$ is enabled to pass through a fully-connected network, wherein when the aggregation mode is adopted, $\hat{H} = \hat{H}_A$, when the concatenation mode is adopted, $\hat{H} = \hat{H}_C$, and the fully-connected network is composed of a plurality of fully-connected layers which are nonlinearly activated:

$$Y' = \sigma'\left(FC_{\theta_{l_2}}\left(\ldots \sigma'\left(FC_{\theta_2}\left(\sigma'\left(FC_{\theta_1}(\hat{H})\right)\right)\right)\right)\right)$$

wherein $\sigma'$ is a nonlinear activation function, $l_2$ is the number of fully-connected network layers, and $FC_{\theta_i}$ is the $i^{th}$ fully-connected layer with a learnable parameter $\theta_i$;

S42, point coordinates $X \in \mathbb{R}^{N \times 3}$ in a point cloud block are duplicated and expanded at the upsampling rate R by cross-layer connection, each row of the matrix is copied for R rows to obtain expanded point cloud block coordinates $X'_T \in \mathbb{R}^{RN \times 3}$, and the expanded point cloud block coordinates are added with an output Y' of the fully-connected network to obtain point coordinates $Y \in \mathbb{R}^{RN \times 3}$ of the point cloud block with the upsampling rate R; and S43, point coordinates in all upsampled point cloud blocks are aggregated, and farthest point resampling is performed to obtain the upsampled three-dimensional point cloud.

In the present embodiment, an input signal is a three-dimensional point cloud to be upsampled, wherein three-dimensional coordinates of each point in space are recorded, and outputs are three-dimensional coordinates of each point in the upsampled three-dimensional point cloud.

In the above-mentioned preferred embodiment, the multi-scale heat kernel graph filters in cross-layer connection are adopted, so that the generation quality of the point cloud can be enhanced, the uniformity of spatial distribution of the upsampled dense point cloud can be promoted, the accurate representation for a geometric structure of a target object is ensured, and at the same time, the convergence rate of network parameter training is increased.

On the basis of the above-mentioned embodiment shown in FIG. 1, further included is parameter optimization in the three-dimensional point cloud upsampling method. In the three-dimensional point cloud upsampling method, a learnable parameter is obtained based on end-to-end training for the point cloud blocks according to training data, which includes:

step 1, three-dimensional point cloud data and upsampled reference point cloud data are collected from a three-dimensional shape in a polygonal grid form by Poisson disk sampling, all collected spatial coordinates of the point cloud are normalized to a unit sphere of which the central point is on an origin location and the radius is 1, a query point is randomly selected as the center from the three-dimensional point cloud, a point closest to the center in spatial distance is selected to form an input point cloud block, and all extracted $K_3$-nearest neighboring blocks are normalized to the unit sphere to serve as a training data set;

step 2, an upsampled three-dimensional point cloud $\hat{Q}$ is obtained from the input three-dimensional point cloud by S2-S4;

step 3, a Chamfer distance between the upsampled three-dimensional point cloud $\hat{Q}$ and a reference point cloud Q is calculated:

$$\mathcal{L}_{CD}(Q, \hat{Q}) = \frac{1}{|Q|}\sum_{q \in Q}\min_{\hat{q} \in \hat{Q}}\|y_q - y_{\hat{q}}\|_2^2 + \frac{1}{|\hat{Q}|}\sum_{\hat{q} \in \hat{Q}}\min_{q \in Q}\|y_q - y_{\hat{q}}\|_2^2$$

wherein $|Q|$ and $|\hat{Q}|$ are respectively the numbers of points in Q and $\hat{Q}$, and $y_q$ and $y_{\hat{q}}$ are respectively three-dimensional coordinates of point q in Q and point q in $\hat{Q}$;

step 4, repulsion loss of spatial distribution of points in the upsampled three-dimensional point cloud Q is calculated:

$$\mathcal{L}_{Rep}(\hat{Q}) = \frac{1}{K_4|Q|}\sum_{\hat{q} \in \hat{Q}}\sum_{\hat{q}_k \in \bar{N}(\hat{q})}\max\left(\eta - \|\hat{q} - \hat{q}_k\|_2^2, 0\right)$$

wherein $\bar{N}(\hat{q})$ is a $K_4$-nearest neighboring point set of point $\hat{q}$, and $\eta$ is an empirical constant;

step 5, a loss function $\mathcal{L} = \mathcal{L}_{CD}(Q,\hat{Q}) + a\mathcal{L}_{Rep}(\hat{Q}) + \beta\|\Theta\|^2$ is calculated, wherein $\|\Theta\|^2$ is a two-norm regularization loss item of a learnable parameter $\Theta$ in the three-dimensional point cloud upsampling method;

step 6, a gradient of the learnable parameter $\Theta$ is calculated according to the loss function, and back propagation is performed to update the learnable parameter $\Theta$ in the three-dimensional point cloud upsampling method; and the above-mentioned steps 2-6 are repeated until convergence, the obtained learnable parameter $\Theta$ is updated for upsampling the three-dimensional point cloud. Based on the technical concept which is the same as above, an embodiment of the present disclosure further provides a three-dimensional point cloud upsampling system, including:

a data acquisition module configured to acquire three-dimensional point cloud data;

a feature extraction module configured to divide the three-dimensional point cloud data into point cloud blocks having a fixed number of points and extract hierarchical features according to point coordinates in the point cloud blocks;

a point set acquisition module configured to achieve different-scale point set feature expansion of the extracted hierarchical features by using multi-scale heat kernel graph convolution; and a coordinate reconstruction module configured to reconstruct upsampled three-dimensional point cloud coordinates from the expanded features.

Technologies adopted in each module in the above-mentioned system may refer to the implementation technologies corresponding to steps in the embodiment of the above-mentioned three-dimensional point cloud upsampling method so as not to be repeated herein.

Based on the technical concept which is the same as above, an embodiment of the present disclosure further provides a three-dimensional point cloud upsampling device, including a memory, a processor and a computer program stored on the memory and capable of running on the processor; and the processor, when executing the computer program, is useful for performing the three-dimensional point cloud upsampling method in any one of the above-mentioned embodiments.

In order to achieve better understanding, the technical solution provided in the above-mentioned embodiment of the present disclosure will be further described in detail below in conjunction with a specific application example.

In the specific application example, three-dimensional point cloud upsampling is achieved, specifically, a three-dimensional point cloud upsampling method based on a graph convolutional neural network includes the following four main steps:

Step 1, a three-dimensional point cloud is divided into overlappable point cloud blocks which have a fixed number of points and are capable of covering all the points. The number of points of the input three-dimensional point cloud is 5,000, and upsampling rates are respectively 4 and 16; when the upsampling rate is 4, the number of the points of the upsampled three-dimensional point cloud is 20,000; and when the upsampling rate is 16, the number of the points of the upsampled three-dimensional point cloud is 80,000. The three-dimensional point cloud is divided into 600 point cloud blocks, and the number of points of each point cloud block is 256.

Step 2, hierarchical features are extracted according to point coordinates in the point cloud blocks.

Feature extraction is performed on the point cloud block by a deeply and densely connected dynamic graph convolutional neural network, input features are three-dimensional coordinates of points in the point cloud blocks, four densely connected dynamic graph convolutional units are used, an input feature of a first dynamic graph convolutional unit is a network input feature, an input feature of a k=2, 3, 4th dynamic graph convolutional unit is an output feature of a (k−1)th dynamic graph convolutional unit, point neighbourhoods $\mathcal{N}^k(i)$ with 16 points are dynamically constructed for each point i, an input feature $h_i^{k-1}$ of the current point is concatenated with a feature translation vector $h_i^{k-1}-h_j^{k-1}$ of the point i relative to an adjacent point j, and spatial graph convolution is performed by using a multilayer perceptron lh has 3 layers and 24 hidden layer neurons and is densely connected to obtain an output point featurelwhich the diIension is 480. The dimensions of the features are reduced to 128 by single fully-connected layer to form the hierarchical features to be delivered to step 3.

Step 3, point set feature expansion of the extracted hierarchical features is achieved by using multi-scale heat kernel graph convolution.

A point neighbour graph with 16 points is constructed according to three-dimensional coordinates of points in the input three-dimensional point cloud, a Laplacian matrix L of corresponding 256×256-dimensional graphs is obtained by calculating an adjacency matrix defined by a Gaussian kernel function of an Euclidean distance between the coordinates of adjacent points. When a heat kernel filter matrix exp(−tL) is calculated, in order to avoid the high calculation cost for feature decomposition, a 5-order Chebyshev polynomial is adopted to approximately achieve the heat kernel graph convolution, that is, $\exp(-tL)x \approx p(L)x = 0.5c_0 x + \sum_{m=1}^{5} c_m T_m(L)x$, wherein a sparse matrix $T_m(L)$ is an m-order Chebyshev polynomial of L, $c_m$ is a Chebyshev coefficient, and approximate filtering may be achieved by multiplying a vector by the efficient sparse matrix. When heat kernel scale parameters $t_1, \ldots, t_S$ are selected, uniform sampling is performed on a logarithmic scale, wherein the number S of scales is the same as the upsampling rate, the minimum heat kernel scale parameter is $t_1=0.05r$, the maximum heat kernel scale parameter is $t_S=0.5r$, wherein r represents a radius of a point cloud block, i.e., a distance from a central point in the block to the farthest point. Coordinates of the point cloud blocks have been normalized in advance, and therefore, r≤1, a nonlinear activation function adopts a rectified linear unit function (ReLU), and an output feature dimension of the heat kernel graph convolution of each point is set as 128.

Step 4, point coordinates in an upsampled three-dimensional point cloud are reconstructed from the expanded features.

The fully-connected network is composed of two fully-connected layers having 64 and 3 neurons, respectively, and the nonlinear activation function adopts a rectified linear unit function (ReLU) and is used for coordinate reconstruction.

On the basis of the above-mentioned specific application example, further included is a specific application example of parameter optimization in the three-dimensional point cloud upsampling method, which includes the following six main steps:

Step 1, three-dimensional model data, i.e., a total of 173 pieces of three-dimensional shape data, used in relevant work is collected to form a training data set. The three-dimensional shape data is stored in a format of a triangular grid, covers a variety of geometric structural features, has complex detail information of both slowly-transformed smooth areas and sharp changes such as sharp corners and edges. Poisson disk sampling is adopted for collecting a point cloud including a three-dimensional point cloud for downsampling as well as 4-times and 16-times upsampled reference three-dimensional point clouds in original triangular grid data. All collected spatial coordinates of the point cloud are normalized to a unit sphere of which the central point is on an origin location and the radius is 1. For each pair of input point cloud P and reference point cloud Q, 200 input point cloud blocks and reference point cloud blocks which have 256 points and correspond to each other are extracted from a central point on the same location by using a K-nearest neighbour searching method to respectively serve as input data and true values (labels) for model training. There are 34,600 pairs of training data blocks in total in the training set. In order to avoid network overfitting, data enhancement is performed on the input point cloud, and random rotation, scaling transformation and Gaussian noise disturbance are performed on coordinates of the point cloud.

Step 2, an upsampled three-dimensional point cloud Q is obtained from the input three-dimensional point cloud by using steps 2-4 in the three-dimensional point cloud upsampling method.

Step 3, a Chamfer distance between the upsampled three-dimensional point cloud Q and a reference point cloud Q is calculated:

$$\mathcal{L}_{CD}(Q, \hat{Q}) = \frac{1}{|Q|}\sum_{q\in Q}\min_{\hat{q}\in\hat{Q}}\|y_q - y_{\hat{q}}\|_2^2 + \frac{1}{|\hat{Q}|}\sum_{\hat{q}\in\hat{Q}}\min_{q\in Q}\|y_q - y_{\hat{q}}\|_2^2$$

wherein $|Q|$ and $|\hat{Q}|$ are respectively the numbers of points in Q and $\hat{Q}$, and $y_q$ and $y_{\hat{q}}$ are respectively three-dimensional coordinates of point q in Q and point $\hat{q}$ in $\hat{Q}$.

Step 4, repulsion loss of spatial distribution of points in the upsampled three-dimensional point cloud Q is calculated:

$$\mathcal{L}_{Rep}(\hat{Q}) = \frac{1}{K_4|Q|}\sum_{\hat{q}\in\hat{Q}}\sum_{\hat{q}_k\in\bar{\mathcal{N}}(\hat{q})}\max(\eta - \|\hat{q} - \hat{q}_k\|_2^2, 0)$$

wherein $\bar{\mathcal{N}}(\hat{q})$ is a $K_4$-nearest neighboring point set of point $\hat{q}$, and $\eta$ is an empirical constant.

Step 5, a loss function $\mathcal{L} = \mathcal{L}_{CD}(Q,\hat{Q}) + \alpha\mathcal{L}_{Rep}(Q) + \beta\|\Theta\|^2$ is calculated, wherein $\|\Theta\|^2$ is a two-norm regularization loss item of a learnable parameter $\Theta$ in the three-dimensional point cloud upsampling method.

Step 6, a gradient of the learnable parameter $\Theta$ is calculated according to the loss function, and back propagation is performed to update the learnable parameter $\Theta$ in the three-dimensional point cloud upsampling method. An Adam optimization algorithm is used, and a learning rate is set as 0.001. The batch size of the training data is set as 28, and the number of training cycles of the network is set as 800.

The above-mentioned steps 2-6 are repeated until convergence, and the obtained learnable parameter $\Theta$ is updated for upsampling the three-dimensional point cloud. Implementation effects:

Contrast methods for implementation effect evaluation include PU-Net, MPU, PU-GAN and PU-Geo. For the sake of fairness, all compared network models are retrained on a collected data set by using an open source removed code, and a parameter is set as a default value. Test data is the Poisson disk sampling achieved in 39 pieces of three-dimensional shape data, the three-dimensional point cloud to be downsampled is collected from original triangular grid data, and the corresponding 4-times and 16-times upsampled reference three-dimensional point clouds are used for evaluation. Table 1 provides the three-dimensional point cloud upsampling method (the aggregation mode and the concatenation mode) provided by the present disclosure and the contrast methods, a Chamfer distance, a Hausdorff distance, an earth moving distance and a parameter quantity relative to a reference three-dimensional point cloud after upsampling. Table 1 shows that the method provided by the present disclosure can remarkably improve the precision of three-dimensional point cloud upsampling. Table 1:4-times and 16-times upsampling results of the three-dimensional upsampling method provided by the present disclosure, a PU-Net, an MPU, a PU-GAN and a PU-Geo on 39 pieces of three-dimensional point cloud test data. CD: Chamfer distance, HD: Hausdorff distance, and EMD: earth moving distance.

| | Upsampling rate | | | | | | | |
|---|---|---|---|---|---|---|---|---|
| | 4 times | | | | 16 times | | | |
| Index | Parameter quantity (Kbytes) | CD ($\times 10^{-4}$) | HD ($\times 10^{-2}$) | EMD ($\times 10^{-2}$) | Parameter quantity (Kbytes) | CD ($\times 10^{-4}$) | HD ($\times 10^{-2}$) | EMD ($\times 10^{-2}$) |
| PU-Net | 814.3 | 3.664 | 0.329 | 0.537 | 2007.8 | 3.504 | 0.453 | 0.621 |
| MPU | 152.1 | 1.716 | 0.169 | 0.330 | 304.1 | 1.091 | 0.161 | 0.413 |
| PU-GAN | 684.2 | 1.850 | 0.801 | 0.459 | 1077.4 | 1.195 | 0.201 | 0.443 |
| PU-Geo | 2125.5 | 0.840 | 0.119 | 0.226 | 2140.9 | 0.358 | 0.106 | 0.345 |
| Method (aggregation) in the present disclosure | 392.3 | 0.721 | 0.090 | 0.197 | 4355.2 | 0.295 | 0.114 | 0.254 |
| Method (concatenation) in the present disclosure | 194.2 | 0.736 | 0.106 | 0.205 | 392.3 | 0.306 | 0.109 | 0.274 |

Compared with a point cloud upsampling network (PU-Net), the three-dimensional point cloud upsampling method in the embodiment of the present disclosure can improve the isolated feature extraction performed on points of a point cloud by multi-branch single-point convolution, and make full use of the spatial correlation between adjacent points of the point cloud. Compared with a multi-stage point cloud upsampling method (MPU) and a generative adversarial network (PU-GAN) for point cloud upsampling, the three-dimensional point cloud upsampling method in the embodiment of the present disclosure can avoid point aggregation problem caused by expansion performed by directly copying features, and can generate a dense point cloud which relatively uniform in spatial distribution; and compared with a point cloud upsampling network based on a graph convolutional network (PU-GCN) and an adversarial residual graph convolutional network (AR-GCN), the three-dimensional point cloud upsampling method in the embodiment of the present disclosure can more effectively represent geometric structural information of a target object; and compared with an edge-aware point set consolidation network (EC-Net) and the point cloud upsampling network based on the graph convolutional network (PU-GCN), the three-dimensional point cloud upsampling method in the embodiment of the present disclosure does not need additional auxiliary data. Therefore, compared with the prior art, the present disclosure achieves consistent performance improvement.

By using the three-dimensional point cloud upsampling method in the above-mentioned embodiment of the present disclosure, a three-dimensional point cloud is widely applied to novel application fields such as automatic driving, environment modeling, immersive communication and virtual guide. However, due to the restriction of hardware performances, an initial point cloud acquired by a 3-D acquisition device (such as Microsoft Kinect and LiDAR sensors) has the characteristics of high sparseness and nonuniform distribution, but point cloud data which is dense, enhanced in detail and relatively uniform in distribution can be generated by three-dimensional point cloud upsampling by using a calculation method, which is beneficial to the subsequent rendering, analysis and curved surface reconstruction, and therefore, the method proposed in the present disclosure has huge industrial application potentiality.

It should be understood by the skilled in the art that the embodiments of the present disclosure may provide a method or computer program product. Therefore, forms of a complete hardware embodiment, a complete software embodiment or a software and hardware aspect combined embodiment may be adopted in the present disclosure. Moreover, a form of a computer program product executed on one or more computer available storage media (including, but not limited to a magnetic disk memory, a CD-ROM and an optical memory) including computer-available program codes may be adopted in the present disclosure.

The present disclosure is described with reference to flow diagrams and/or block diagrams of the method, device (system) and computer program product according to the embodiments of the present disclosure. It should be understood that each flow and/or block in the flow diagrams and/or block diagrams as well as combinations of flows and/or blocks in the flow diagrams and/or block diagrams may be realized by computer program instructions. The computer program instructions may be provided to a general-purpose computer, a special-purpose computer, an embedded processor or processors of other programmable data processing devices to generate a machine, so that an apparatus for realizing specified functions in one or more flows in the flow programs and/or one or more blocks in the block diagrams is generated through the instructions executed by the computer or the processors of other programmable data processing devices.

These computer program instructions may also be stored in a computer readable memory capable of guiding the computer or other programmable data processing devices to work in a specific way, so that the instructions stored in the computer readable memory generate a product including an instruction apparatus, and the instruction apparatus realizes the functions specified in the one or more flows in the flow diagrams and/or one or more blocks in the block diagrams.

These computer program instructions may also be loaded in the computer or other programmable data processing devices, so that a series of operation steps are performed on the computer or other programmable data processing devices to generate processing realized by the computer, and furthermore, the instructions executed on the computer or other programmable data processing devices provide steps for realizing the specified functions in the one or more flows in the flow diagrams and/or one or more blocks in the block diagrams.

Although the preferred embodiments of the present disclosure have been described, those skilled in the art can make additional changes and modifications on these embodiments once they acquire the basic creative concept. Therefore, appended claims are intended to be explained to include the preferred embodiments and all the changes and modifications that fall within the scope of the present disclosure.

Obviously, those skilled in the art can make various changes and modifications on the present disclosure without departing from the spirit and scope of the present disclosure. Thus, the present disclosure is also intended to encompass these changes and modifications if such changes and modifications of the present disclosure fall within the scope of the claims of the present disclosure and equivalents thereof.

What is claimed is:

1. A three-dimensional point cloud upsampling method, comprising:
dividing a three-dimensional point cloud into overlappable point cloud blocks which have a fixed number of points and are capable of covering all the points;
extracting hierarchical features according to point coordinates in the point cloud blocks;
achieving point set feature expansion of the extracted hierarchical features by using multi-scale heat kernel graph convolution; and
reconstructing point coordinates in an upsampled three-dimensional point cloud from the expanded features;
wherein said extracting hierarchical features according to point coordinates in the point cloud blocks is achieved by a deeply and densely connected dynamic graph convolutional network;
the dynamic graph convolutional network is composed of a plurality of dynamic graph convolutional units, inputs of the network are three-dimensional coordinates $X \in \mathbb{R}^{N \times 3}$ of N points in the point cloud blocks, and outputs of the network are the hierarchical features $H \in \mathbb{R}^{N \times n_H}$, wherein an input feature of a first dynamic graph convolutional unit is expressed as $\hat{H}^0 = X$, an output feature $\hat{H}^{k-1}$ of a $(k-1)^{th}$ dynamic graph convolutional unit is used as an input feature of a $k^{th}$ dynamic graph convolutional unit, updating is performed to obtain an output feature $\hat{H}^k$ of the $k^{th}$ dynamic graph convolutional unit, and an output feature $\hat{H}^{l_1}$ of the final $l_1^{th}$ dynamic graph convolutional unit is used as the output hierarchical features $H \in \mathbb{R}^{N \times n_H}$;

the dynamic graph convolutional units perform the following operations:

constructing $K_1$-nearest neighbor graph $\mathcal{G}_1^k$ according to the similarity among input features $\hat{H}^{k-1} \in \mathbb{R}^{N \times n_h^{k-1}}$ to generate an adjacency matrix $A_1^k$;

for an $n_h^{k-1}$-dimensional input feature $\hat{h}_i^k \in \mathbb{R}^{n_h^{k-1}}$ of any point i, calculating an $n_h^{k-1}$-dimensional feature translation vector $\hat{h}_i^k - \hat{h}_j^k$ relative to all adjacent points j, performing concatenation with an input feature $\hat{h}_i^k$ to generate a $2n_h^{k-1}$-dimensional vector $\mathrm{ConcatV}(\hat{h}_i^j, \hat{h}_j^k - \hat{h}_i^k)$ and extracting a local neighborhood feature $\tilde{h}_{ij}^k \in \mathbb{R} n_h^k$ of the point by graph convolution:

$$\tilde{h}_{ij}^k = \mathrm{GConv}_{\Theta^k}(\mathrm{ConcatV}(\hat{h}_i^k, \hat{h}_j^k - \hat{h}_i^k))$$

wherein ConcatV is a concatenation operation for the vectors, and $\Theta^k \in \mathbb{R}^{2n_h^{k-1} \times n_h^k}$ is a learnable parameter of graph convolution $\mathrm{GConv}_{\Theta_k}$;

for a neighbourhood $\mathcal{N}^k(i)$ of the point i, aggregating local neighbourhood features $\tilde{h}_{ij}^k, j \in \mathcal{N}^k(i)$ as an output feature $$h_i^k \in \mathbb{R}^{n_h^k}: h_i^k = \max_{j \in \mathcal{N}^k(i)} \tilde{h}_{ij}^k$$

of the point by rank-invariant maximum pooling layers; and merging output features $h_i^k$ of all the points to obtain an output feature matrix $\hat{H}^k \in \mathbb{R}^{N \times n_h^k}$ of a point cloud block with N points.

2. The three-dimensional point cloud upsampling method of claim 1, wherein the multi-scale heat kernel graph convolution is achieved by a multi-scale heat kernel graph filter bank in cross-layer connection, and responses of the multi-scale heat kernel graph filter bank are achieved by any one of the following ways:

an aggregation way in which the parameter complexity is high and the number of scales is variable; and a concatenation way in which the parameter complexity is low and the number of scales is fixed as an upsampling rate R.

3. The three-dimensional point cloud upsampling method of claim 2, wherein when the multi-scale heat kernel graph convolution is achieved in the aggregation way, the three-dimensional point cloud upsampling method comprises:

enabling the input hierarchical features $H \in \mathbb{R}^{N \times n_H}$ to respectively pass through S heat kernel graph filters with different heat diffusion scales $t_1, \ldots, t_S$, and obtaining S corresponding filtering responses $H_1, \ldots, H_S$ according to a nonlinear activation function $\sigma(\bullet)$, wherein a filtering response $H_s \in \mathbb{R}^{N \times Rn_H}$ to a scale s is expressed as:

$$H_s = \sigma(\exp(-t_s L) H W_s)$$

wherein $\exp(-t_s L) \in \mathbb{R}^{N \times N}$ is a heat kernel function of a heat diffusion scale $t_s$, L is a Laplacian matrix of $K_2$-nearest neighbor graph constructed according to the similarity among point coordinates in an input point cloud block, $W_s \in \mathbb{R}^{n_H \times Rn_H}$ is a learnable parameter matrix of the $s^{th}$ scale and is used for feature transformation and adaptive aggregation of the scale s, the number of rows is an input feature dimension $n_H$, and the number of columns is a product of the input feature dimension and an upsampling rate $Rn_H$;

summing S filtering responses with different heat diffusion scales to obtain an aggregated feature matrix, rearranging the aggregated feature matrix, keeping the number of matrix elements constant, enabling the number of the rows of the matrix to be equal to the number RN of upsampled target points, and enabling the number of the columns to be a dimension $n_H$ of the input feature:

$$H'_A = \mathrm{Reshape}\left(\sum_{s=1}^{S} H_s\right)$$

wherein Reshape $(\bullet): \mathbb{R}^{N \times Rn_H} \to \mathbb{R}^{RN \times n_H}$ is a rearranging operation for obtaining a rearranged feature matrix $H'_A \in \mathbb{R}^{RN \times n_H}$; and duplicating and expanding the input hierarchical features $H \in \mathbb{R}^{N \times n_H}$ at the upsampling rate R by cross-layer connection, copying each row of the matrix for R rows to obtain an expanded input feature $H'_T \in \mathbb{R}^{RN \times n_H}$, and adding the expanded input feature with the aggregated feature matrix HA to obtain an expanded feature matrix $\hat{H}_A \in \mathbb{R}^{RN \times n_H}$.

4. The three-dimensional point cloud upsampling method of claim 2, wherein when the multi-scale heat kernel graph convolution is achieved in the concatenation way, the three-dimensional point cloud upsampling method comprises:

enabling the input hierarchical features $H \in \mathbb{R}^{N \times n_H}$ to respectively pass through R heat kernel graph filters with different heat diffusion scales $t_1, \ldots, t_R$, and obtaining R corresponding filtering responses $H_1, \ldots, H_R$ according to a nonlinear activation function $\sigma(\bullet)$, wherein a filtering response $H_s \in \mathbb{R}^{N \times n_H}$ to a scale s is expressed as:

$$H_s = \sigma(\exp(-t_s L) H W_s)$$

wherein $\exp(-t_s L) \in \mathbb{R}^{N \times N}$ is a heat kernel function of a heat diffusion scale $t_s$, L is a Laplacian matrix of $K_2$-nearest neighbor graph constructed according to the similarity among point coordinates in an input point cloud block, $W_s \in \mathbb{R}^{R_H \times n_H}$ is a learnable parameter matrix of the $s^{th}$ scale and is used for feature transformation and adaptive aggregation of the scale s, and both of the number of rows and the number of columns are input feature dimensions $n_H$;

aligning R filtering responses with different heat diffusion scales in rows to perform concatenation to obtain a concatenated feature matrix $H'_C \in \mathbb{R}^{RN \times n_H}$:

$$H'_C = \mathrm{ConcatM}(H_1, H_2, \ldots, H_R)$$

wherein ConcatM is a concatenation operation based on alignment in rows; and duplicating and expanding the input hierarchical features $H \in \mathbb{R}^{N \times n_H}$ at the upsampling rate R by cross-layer connection, copying each row of the matrix for R rows to obtain an expanded input feature $H'_T \in \mathbb{R}^{RN \times n_H}$, and adding the expanded input feature with the concatenated feature matrix $H'_C$ to obtain an expanded feature matrix $\hat{H}_C \in \mathbb{R}^{RN \times n_H}$.

5. The three-dimensional point cloud upsampling method of claim 4, wherein said reconstructing point coordinates in an upsampled three-dimensional point cloud from the expanded features comprises:

enabling an expanded feature matrix $\hat{H}$ to pass through a fully-connected network, wherein when the aggregation mode is adopted, $\hat{H} = \hat{H}_A$, when the concatenation mode is adopted, $\hat{H}=\hat{H}_C$, and the fully-connected network is composed of a plurality of fully-connected layers which are nonlinearly activated:

$$Y' = \sigma'\left(FC_{\theta_{l_2}}\left(\ldots \sigma'\left(FC_{\theta_2}\left(\sigma'\left(FC_{\theta_1}(\hat{H})\right)\right)\right)\right)\right)$$

wherein $\sigma'$ is a nonlinear activation function, $l_2$ is the number of fully-connected network layers, and $FC_{\theta_i}$ is the $i^{th}$ fully-connected layer with a learnable parameter $\Theta_i$;

duplicating and expanding point coordinates $X \in \mathbb{R}^{N \times 3}$ in a point cloud block at the upsampling rate R by cross-layer connection, copying each row of the matrix for R rows to obtain expanded point cloud block coordinates $X'_T \in \mathbb{R}^{RN \times 3}$, and adding the expanded point cloud block coordinates with an output Y' of the fully-connected network to obtain point coordinates $Y \in \mathbb{R}^{RN \times 3}$ of the point cloud block with the upsampling rate R; and aggregating point coordinates in all upsampled point cloud blocks, and performing farthest point resampling to obtain the upsampled three-dimensional point cloud.

6. The three-dimensional point cloud upsampling method of claim 1, wherein the learnable parameter in the three-dimensional point cloud upsampling method is obtained based on end-to-end training for the point cloud blocks, which comprises:

collecting three-dimensional point cloud data and upsampled reference point cloud data from a three-dimensional shape in a polygonal grid form by Poisson disk sampling, normalizing all collected spatial coordinates of the point cloud to a unit sphere of which the central point is on an origin location and the radius is 1, randomly selecting a query point as the center from the three-dimensional point cloud, selecting a point closest to the center in spatial distance to form an input point cloud block, and normalizing all extracted $K_3$-nearest neighboring blocks to the unit sphere to serve as a training data set;

obtaining an upsampled three-dimensional point cloud $\hat{Q}$ from the three-dimensional point cloud by using the three-dimensional point cloud upsampling method, specifically comprising: extracting hierarchical features according to point coordinates in the point cloud blocks; achieving point set feature expansion of the extracted hierarchical features by using multi-scale heat kernel graph convolution; and reconstructing point coordinates in an upsampled three-dimensional point cloud from the expanded features;

calculating a Chamfer distance between the upsampled three-dimensional point cloud Q and a reference point cloud Q:

$$\mathcal{L}_{CD}(Q, \hat{Q}) = \frac{1}{|Q|}\sum_{q \in Q}\min_{\hat{q} \in \hat{Q}}\|y_q - y_{\hat{q}}\|_2^2 + \frac{1}{|\hat{Q}|}\sum_{\hat{q} \in \hat{Q}}\min_{q \in Q}\|y_q - y_{\hat{q}}\|_2^2$$

wherein $|Q|$ and $|\hat{Q}|$ are respectively the numbers of points in Q and $\hat{Q}$, and $y_q$ and $y_{\hat{q}}$ are respectively three-dimensional coordinates of point q in Q and point $\hat{q}$ in $\hat{Q}$;

calculating repulsion loss of spatial distribution of points in the upsampled three-dimensional point cloud $\hat{Q}$:

$$\mathcal{L}_{Rep}(\hat{Q}) = \frac{1}{K_4|\hat{Q}|}\sum_{\hat{q} \in \hat{Q}}\sum_{\hat{q}_k \in \bar{N}(\hat{q})}\max(\eta - \|\hat{q} - \hat{q}_k\|_2^2, 0)$$

wherein $\bar{N}(\hat{q})$ is a $K_4$-nearest neighboring point set of point q, and n is an empirical constant;

calculating a loss function $\mathcal{L}=\mathcal{L}_{CD}(Q,\hat{Q}) + \alpha\mathcal{L}_{Rep}(\hat{Q}) + \beta\|\Theta\|^2$, wherein $\|\Theta\|^2$ is a two-norm regularization loss item of a learnable parameter $\Theta$ in the three-dimensional point cloud upsampling method;

calculating a gradient of the learnable parameter $\Theta$ according to the loss function, and performing back propagation to update the learnable parameter $\Theta$ in the three-dimensional point cloud upsampling method; and repeating the steps of three-dimensional point cloud upsampling, loss function calculation and back propagation until convergence, and updating the obtained learnable parameter for upsampling the three-dimensional point cloud.

7. A three-dimensional point cloud upsampling device, comprising a memory, a processor and a computer program stored on the memory and capable of running on the processor; wherein the processor, when executing the computer program, is useful for performing the three-dimensional point cloud upsampling method of claim 1.

* * * * *